Figure 1:
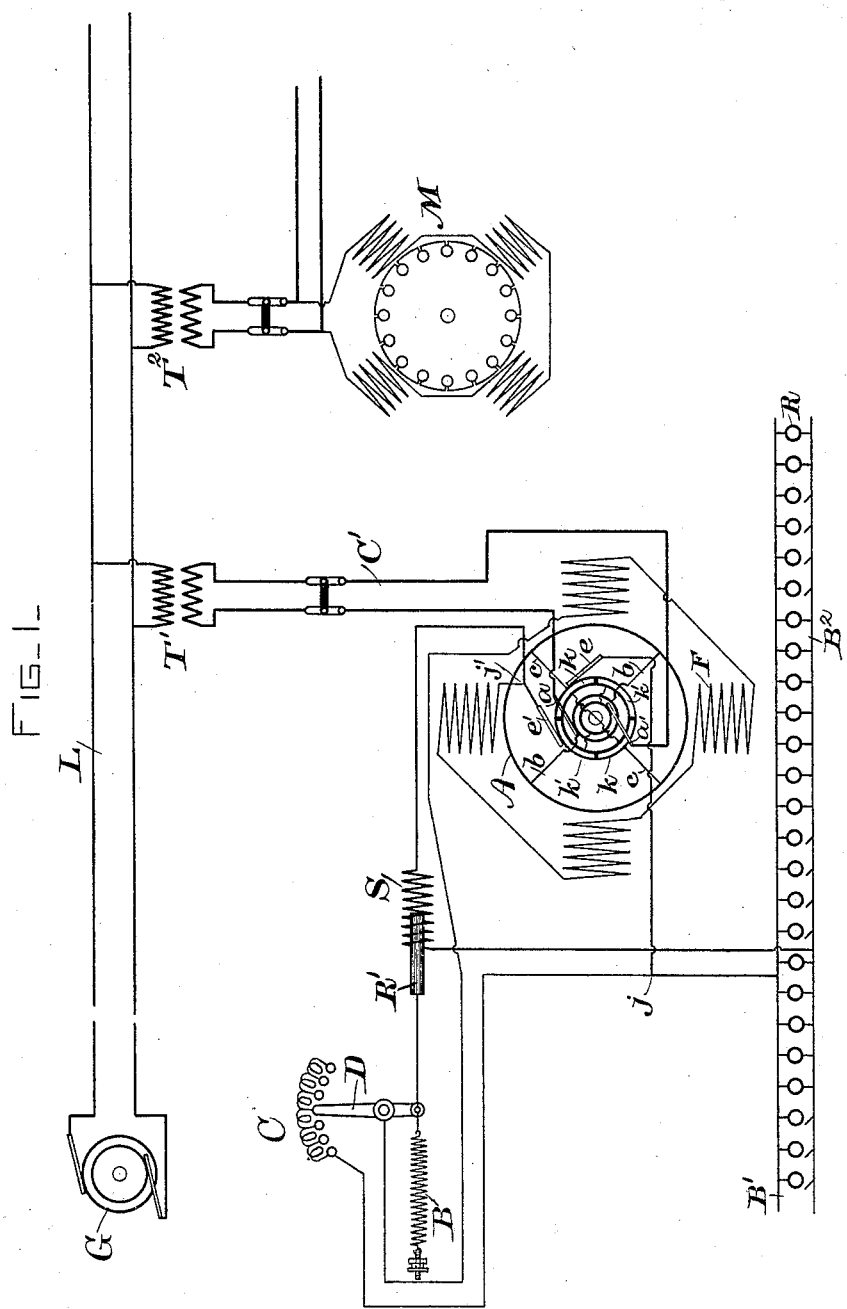

(No Model.) 2 Sheets—Sheet 1.

C. P. STEINMETZ.
CONTROLLING PHASE RELATIONS.

No. 543,907. Patented Aug. 6, 1895.

WITNESSES.
Henry O. Westendarp
A. O. Ome

INVENTOR.
Charles P. Steinmetz
By Bentley + Bradgett
Attys.

(No Model.)
2 Sheets—Sheet 2.

C. P. STEINMETZ.
CONTROLLING PHASE RELATIONS.

No. 543,907.  Patented Aug. 6, 1895.

WITNESSES.
Alec F. Macdonald.
[signature]

INVENTOR
Charles P. Steinmetz
By Bentley & Blodgett
Attys.

UNITED STATES PATENT OFFICE.

CHARLES P. STEINMETZ, OF LYNN, ASSIGNOR TO THE GENERAL ELECTRIC COMPANY, OF BOSTON, MASSACHUSETTS.

CONTROLLING PHASE RELATIONS.

SPECIFICATION forming part of Letters Patent No. 543,907, dated August 6, 1895.

Application filed September 9, 1893. Serial No. 485,186. (No model.)

*To all whom it may concern:*

Be it known that I, CHARLES P. STEINMETZ, of Breslau, in the Kingdom of Prussia and Empire of Germany, a subject of the Emperor of Germany, now residing at Lynn, county of Essex, State of Massachusetts, have invented a certain new and useful Improvement in Automatic Phase-Controllers for Alternating Currents, of which the following is a specification.

The present invention relates to the control of the phase relation between the current and electromotive force in an alternating circuit; and it consists of certain means for effecting the desired control automatically, the principal features comprising an electrodynamic phase-controller and a regulating device so organized as to respond to changes in the current strength flowing in the circuit and to modify correspondingly the action of the controller upon the phase relation between current and electromotive force. An automatic regulator of this character may be adjusted so as to maintain a desired relation—as, for example, one of harmony—in spite of changes in the main current, for the lagging or displaced phase relation of the current varies with its strength when we disregard differences arising from changes in the nature of the translating devices themselves. Hence the same variations of current in a circuit of translating devices which tend to increase or decrease the lag may bring into play correspondingly-varying balancing influences; or, as it may be regarded from another point of view, the amount of the lagging or retarded current (if the current is behind the electromotive force) or of the leading or accelerated current (if the current is in advance of the electromotive force) will, if the nature of the translating device is not changed, vary in proportion to the main current strength. Hence, in order to compensate for the displaced current, the corrective current flowing in the phase-controller should vary as the main current varies.

In other applications recently filed by me it is set forth that a synchronous machine, serving either as a motor, generator, or rotary transformer, will act to accelerate or retard the current relatively to the electromotive force if the strength of its field is, in the one case, raised above the amount necessary to maintain an equality between the impressed and counter electromotive forces when loss in the machine itself is disregarded, or, in the other case, if the field strength is reduced below this normal standard. It is also shown in said applications that induction-controllers, generally similar to induction-motors, have a like effect of changing the phase relation between current and electromotive force when the running speed is greater or less than that of synchronism.

The immediate aim of the present invention is to make the action of such phase-controllers automatic. In fact, in its broadest terms the invention includes the automatic regulation of a phase-controller, even although the controller be not of the electrodynamic type suggested above.

In the accompanying drawing there are shown diagrammatically an alternating current series and parallel distribution systems with the present invention made a part thereof.

In the figure of the drawing there is shown a generator G of alternating currents which feeds a main circuit L.

Transformers T' T² have their primaries connected in parallel with the line L, and their secondaries lead to the translating devices, which in one case are represented as lamps R and in another case as motors M. The distribution system so shown, however, is intended to be illustrative only, for it may be of any desired character and extent, and the alternating current may have a single phase or plural phases.

The phase-controller is coupled in circuit between the transformer T' and the lamps R, and, as shown, it consists of a synchronous rotary transformer rectifying the current fed to the lamps, though it will be understood that other phase-controllers may be regulated automatically in a similar manner, so that the invention while shown applied to this special type of machine is not necessarily limited thereto.

The armature A of the phase-controller has its terminals coupled with the mains C', so that it is traversed by the current passing to the lights. After passing through the armature the current is rectified, and a portion of it which is shunted around the lamps passes through the field-coils F of the controller and a resistance C coupled in series with the field-coils. This resistance, and consequently the strength of the magnetic field of the controller, is regulated automatically by the action of a solenoid S in circuit with the lamps, which attracts a core R' connected to a contact-lever D in such manner as to cut out resistance from the field-circuit. The lever is moved in the opposite direction by an adjustable spring B whenever the attractive force of the solenoid S falls below the retractile power of the spring.

The circuit connections may be traced as follows: The current entering the controller from one side of the circuit C' by brush $a$ passes to the armature by the connection $b$, whence it goes by connection $c$ to a segment $k$ of a rectifying-commutator, on which rests a brush $e$, connected to one of the lighting-mains B'. From the other of said mains B² the current passes through the solenoid S, and thence to a brush $e'$ resting on a segment $k'$ of the commutator. This last segment is connected to the inner terminal ring of the armature, on which rests a brush $a'$ joined to the other side of the circuit C'. The field-coils are in a shunt to the lamps, which, starting from the point $j$, leads to the resistance C, and thence from the lever D through the different field-coils in series, joining the main circuit at $j'$. It will now be understood that as the current passing to the lamp increases when additional lamps are put in circuit an increased attraction will be exerted by the solenoid S, which will result in lowering the resistance of the field-circuit and increasing the strength of such field, so that as the lagging tendency of the current increases with the added current in the circuit, the compensating effect exerted by the phase-controller tending to overcome this lag is correspondingly augmented. When lamps are cut out of the circuit the reverse action takes place, so that the spring B, by cutting resistance into circuit at C, weakens the field of the transformer in proportion to the decrease in the main current.

Figure 2:
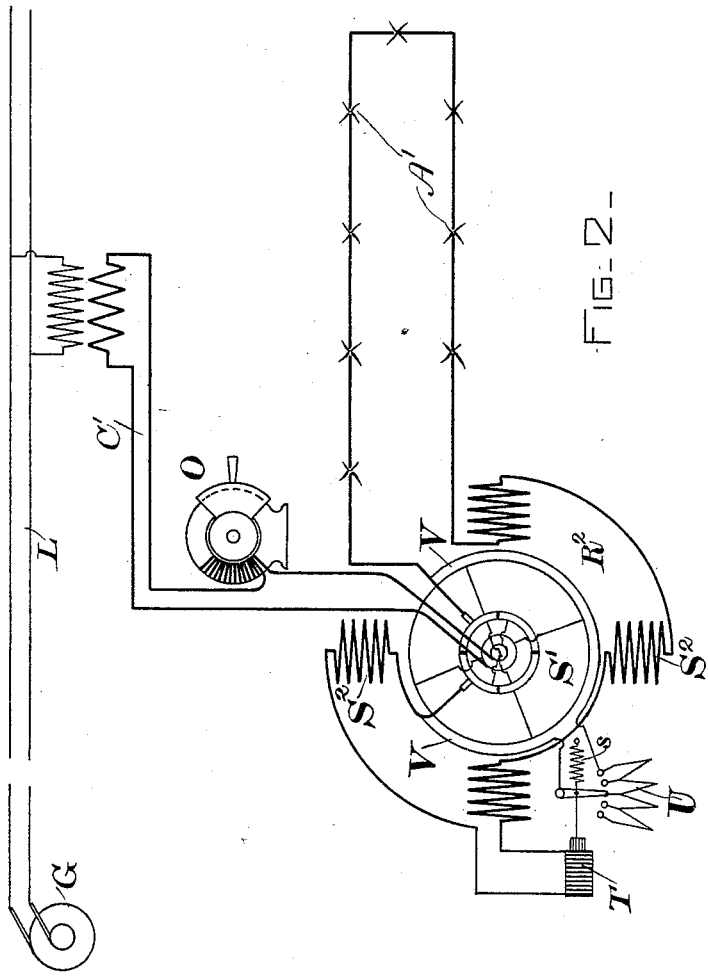

In Fig. 2, arc-lamps or other translating devices are shown at A, connected in series with the controller and secondary mains C'. The phase-controller R is of the same kind as in Fig. 1, and acts in a similar manner, though the connections are so changed that the exciting-coils S are in series with the armature S', and the field strength is regulated by a solenoid T in the main circuit, which acts against a spring $s$ to cut in or out the resistance of a rheostat U in a shunt-circuit V around the exciting-coils. Hence, on an increase of the main current for any cause, the field of the controller will be strengthened by increasing the resistance of the shunt. Should the strength of the main current diminish, the field will be weakened by the action of the spring overcoming the solenoid and lessening the resistance of the shunt. An adjustable reactive coil O is included in the circuit of one of the circuit-mains.

The essential elements of the invention, therefore, are a phase-controller, by which the desired control of phase is secured, and a regulator therefor, whose action is controlled by a device responsive to changes in the strength of the main current, so that the corrective influence of the controller is made to keep pace with the need for such correction incident to greater or less current strength.

What I claim as new, and desire to secure by Letters Patent, is—

1. The combination in an alternating current distribution system, of a phase controller coupled directly or indirectly in circuit so as to accelerate or retard the current relatively to the electro-motive force as required, and a regulator responsive to changes in current strength for varying said accelerating or retarding influence, as described.

2. The combination in an alternating current distribution system, of an electro-dynamic phase controller comprising magnetic members which rotate relatively to one another, and adapted to exert an accelerating or retarding influence upon the current relatively to the electro-motive force, and an automatic regulator therefor regulating the action of said controller in response to changes in current strength, as set forth.

3. The combination in an alternating current system of distribution, of an electro-dynamic phase controller having magnetic members which rotate relatively to one another, and an electro-magnetic regulator responsive to variations in current strength, and regulating the inductive action in the controller, and thereby the phase relation between current and electro-motive force in the circuit, as set forth.

4. The combination in an alternating current system of distribution, of a synchronous electro-dynamic machine coupled in circuit so as to control the phase relation between current and electro-motive force, a resistance for regulating the field strength of said machine, and an electro-magnetic device acting to cut said resistance into or out of circuit in response to changes of current strength, as described.

In witness whereof I have hereunto set my hand this 7th day of September, 1893.

CHARLES P. STEINMETZ.

Witnesses:
JOHN W. GIBBONEY,
BENJAMIN B. HULL.